April 25, 1967 A. MOUTET ETAL 3,315,472

HYPERGOLIC GAS GENERATOR

Filed Oct. 13, 1965 8 Sheets-Sheet 1

INVENTORS
ANDRÉ MOUTET
HELÈNE MOUTET
BY Dayton R. Stemple Jr.
ATTORNEY

INVENTORS
ANDRÉ MOUTET
BY HELÈNE MOUTET
Dayton R. Stemple, Jr.
ATTORNEY

April 25, 1967 A. MOUTET ETAL 3,315,472

HYPERGOLIC GAS GENERATOR

Filed Oct. 13, 1965 8 Sheets-Sheet 3

INVENTORS
ANDRÉ MOUTET
BY HELÈNE MOUTET
Dayton R. Stemple Jr.
ATTORNEY

INVENTORS
ANDRÉ MOUTET
HELÈNE MOUTET
BY Dayton A. Stemple, Jr.
ATTORNEY

INVENTORS
ANDRÉ MOUTET
HELÈNE MOUTET
BY Dayton R. Stemple Jr.
ATTORNEY

HYPERGOLIC GAS GENERATOR

Filed Oct. 13, 1965

INVENTORS
ANDRÉ MOUTET
HELÈNE MOUTET
BY Dayton R. Stemple, Jr.
ATTORNEY

HYPERGOLIC GAS GENERATOR

Filed Oct. 13, 1965 8 Sheets-Sheet 7

INVENTORS
ANDRÉ MOUTET
BY HÉLÈNE MOUTET
Dayton R. Stemple Jr.
ATTORNEY

INVENTORS
ANDRÉ MOUTET
BY HELÈNE MOUTET
Dayton G. Stemple Jr.
ATTORNEY

United States Patent Office 3,315,472
Patented Apr. 25, 1967

3,315,472
HYPERGOLIC GAS GENERATOR

André Moutet and Hélène Moutet, Villaine-par-Massy, France, assignors to Office National d'Etudes et de Recherches Aerospatiales, Chatillon-sous-Bagneux, France, a French body corporate Filed Oct. 13, 1965, Ser. No. 495,603
Claims priority, application France, Aug. 30, 1961, 602; July 12, 1962, 903,830; July 11, 1963, 941,153
22 Claims. (Cl. 60—251)

This application is a continuation-in-part of our applications Nos. 217,588 filed Aug. 17, 1962, now abandoned and 381,033 filed July 8, 1964.

The present invention relates to high velocity hot gas stream generators, and in particular to rocket engines, of the hypergolic hybrid type, i.e. comprising a solid component housed in a reaction chamber and at least one other component stored in the liquid state gradually delivered into the reaction chamber, this second mentioned component being hypergolic in the fluid state with respect to the solid component, i.e. capable, by the mere fact that it is brought in contact therewith, of spontaneously reacting therewith to generate hot gases which are ejected from the reaction chamber in the form of a high velocity gaseous stream escaping through at least one outlet nozzle provided at the rear end of said chamber. Examples of solid components of this type are given in our copending application Ser. No. 431,611 filed Feb. 10, 1965 for Improvements in Hypergolic Systems, in Particular for Use in Rocket Engines.

The object of this invention is to provide a hot gas generator of this type which is better adapted to meet the requirements of practice than those known up to this time and in particular which is capable of giving off per unit of time a greater amount of energy, while preserving a stable operation.

Preferred embodiments of our invention will be hereinafter described with reference to the appended drawings, given merely by way of example, and in which:

FIG. 1 diagrammatically shows, in axial section, a hypergolic hybrid rocket engine embodying a first feature of the invention;

FIG. 1*a* is a similar view embodying a second feature of the invention;

A rocket engine according to this invention comprises the following elements.

Figure 3:
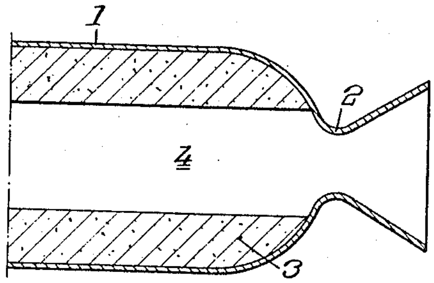
FIG. 3 is a partial view showing a modification of the rear portion of the rocket engine.

(a) A combustion chamber 1 for instance of substantially cylindrical shape, provided at its rear end with a jet nozzle 2;

(b) At least one solid component arranged in combustion chamber 1 in such manner as to leave therein a longitudinal conduit 4; when several solid components are provided, they may be of different compositions respectively; advantageously and as it will be hereinafter supposed, the solid component forms a kind of sleeve lining the inner wall of combustion chamber 1; this sleeve may extend as far as the convergent portion of nozzle 2 as shown by FIG. 3; this conduit 4 therefore advantageously forms a central conduit extending substantially from the upstream end of the combustion chamber to the downstream end thereof; this conduit may be for instance cylindrical or it may be partly convergent;

(c) A device 5 for delivering, for instance by injection and preferably in an adjustable manner, at the upstream end of central conduit 4, at least a portion of the component stored in the liquid state, this last mentioned component having a hypergolic character with respect to at least the solid component **3*a* located in the portion of combustion chamber 1** where the liquid component is injected.

With a gas generator made of only the elements above described, it is practically impossible, by increasing the rate of feed of the fluid component, to increase the consumption of solid component above a limit depending upon the nature and composition of the hypergolic system while preserving a good combustion efficiency and/or a stable operation. Defects of stability may be of very different kinds (periodic, aperiodic, intermittent, and so on) which may, in some cases, lead to deteriorations of the gas generator.

According to one feature of our invention, for obviating these drawbacks or at least reducing them considerably, we make use of at least one transverse obstacle comprising at least one orifice, this obstacle reducing the transverse cross-section area of the longitudinal conduit 4 in such manner as to increase the time for which the fluid stream remains upstream of said obstacle. Such an obstacle as diagrammatically shown at 6, **6*a* and 6*b* consists for instance of a perforated diaphragm. Whereas components 3, 3*a*, 3*b* or 3*c* are rapidly consumed, the diaphragm 6, 6*a* or 6*b*** is substantially resistant to the thermal and erosive actions within the combustion chamber.

Figure 2:
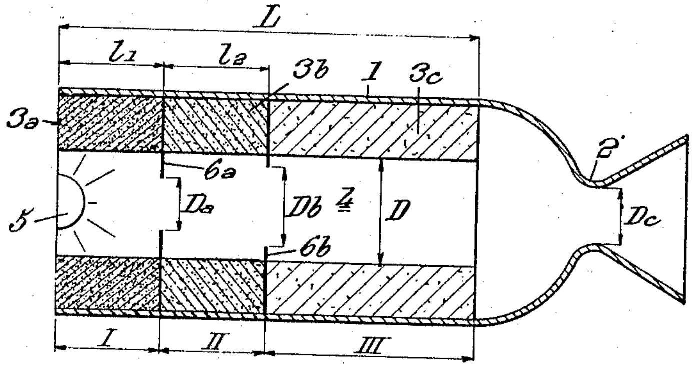
FIG. 2 is a diagrammatic axial section of another embodiment.

In particular cases as shown by FIG. 2, it may be necessary to use several, for instance two, successive diaphragms **6*a*, 6*b* for locally reducing the transverse cross-section of the longitudinal conduit 4**.

The phenomena that take place may be explained as follows:

The combustion reaction in zone I located upstream of the first screen **6*a* must take place initially and partly between the solid component and the fluid component that is injected. A great portion of the fluid component delivered by injector 5 enters into contact with the solid component $3a$. Subsequently, the fluid mass produced by the reaction further comprises vaporized and possibly decomposed amounts of the fluid components and gases still reactive and resulting from an incomplete reaction between the fluid component and the solid component or from a pyrolysis of the latter. The reducing of cross-section produced by diaphragm 6***a* has in fact for its effect to increase the time for which the fluid mass above referred to remains upstream of the diaphragm that is to say in zone I, which increase produces a corresponding increase of the intensity of consumption of the solid component in said zone I. These phenomena, due to the reducing of cross-section by diaphragm 6*a*, take place in a similar manner upstream of the successive diaphragm 6*b* (further successive diaphragms could be provided, if desired).

Thus diaphragm 6*b* increases the intensity of consumption of the solid component in zone II, the last downstream diaphragm which may be provided at the rear end of zone III increasing the intensity of consumption of the solid component in this zone.

Concerning diaphragms 6*a* and 6*b*, the cross-sections of the passages through them are preferably as follows, it being supposed, for the sake of simplicity that the cross-section of the passage in each diaphragm consists of a circular central orifice of diameter D*a* or D*b* as represented on the drawing.

Figure 1A:
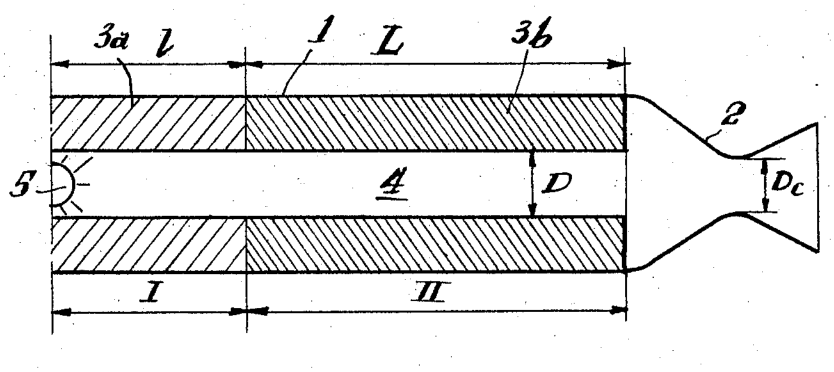
Figure 1:
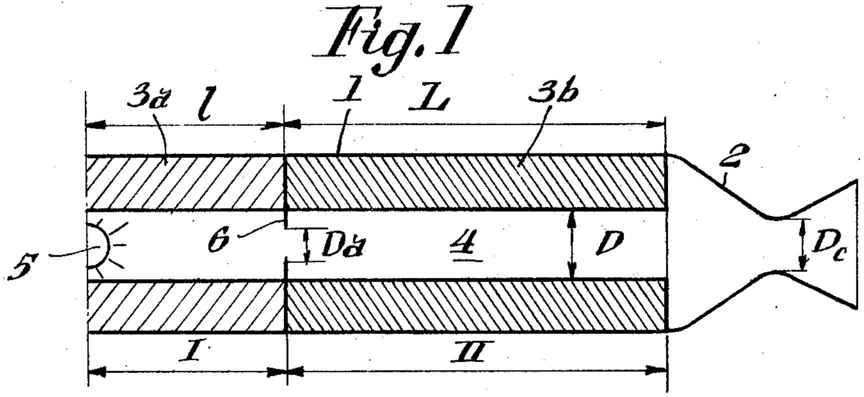

The conditions relative to the respective diameter D*a* and D*b* of diaphragms 6*a* and 6*b* should be as follows, D*c* being the diameter at the neck of nozzle 2:

(1) D*a* is from 0.35 to 2.5 D*c* if, as shown by FIG. 1, there is only one diaphragm 6*a* and D*a* is the diameter of the central hole in said diaphragm.

(2) $Db > Da$ if, as shown by FIG. 2, there are two diaphragms 6*a* and 6*b* and D*b* is the diameter of the hole in diaphragm 6*b*.

Concerning condition (1), it should be pointed out that it defines, for parameter D*a*/D*c*, a range such that:

(a) Below it, there are produced in zone I overpressures making it necessary exaggeratedly to increase the pressure of injection of the oxidizer, which requires in particular an increase of the weight of the injector device; and (b) Above it, some unstability of combustion may occur in particular for high relative thrusts.

As for condition (2) it will be advantageous, while complying thereto, also to comply with the further following condition:

(3) D is from 1.1 to 1.6 D*b* wherein D is the initial diameter of the longitudinal passage 4 which generally complies with the relation (4) D is from 1 to 1.6 D*c*

Concerning now the conditions relative to the longitudinal position of the diaphragms, the reference parameters will be:

(a) The total length L of the block of solid components;

(b) The length $l_1$ of the region extending between injector 5 and the plane of diaphragm 6*a*; and (c) Possibly (FIG. 2), the length $l_2$ of the region extending between the respective planes of diaphragms 6*a* and 6*b*.

The conditions will be:

(5) $l_1$ is from 0.10 to 0.5 L this condition being independent of the number of diaphragms (6) $l_2$ is from 0.10 to 0.4 L which applies when there is a second diaphragm.

It must be specified that the diaphragms are preferably, but not necessarily, located in the planes where two portions of different respective compositions adjoin each other, when the solid component is made of portions of different compositions.

It should be stressed that the use of at least one diaphragm such as 6*a* has for its effect to increase the intensity of consumption of the solid component in the portion of the rocket combustion chamber upstream of said diaphragm 6*a* and thus to increase the thrust. This result is due to the fact that the fluid products are forced to remain for a longer time in said combustion chamber portion. In essence, the diaphragm must be downstream far enough so that the injected fuel is consumed in the combustion chamber but sufficiently upstream so that the injected fuel remains for passage into the downstream portion II of the chamber.

It has been found that in the absence of a diaphragm for a flow rate of the fluid component above a given value, the thrust no longer increases and, on the contrary, decreases, with the occurrence of serious unstabilities.

Figure 4:
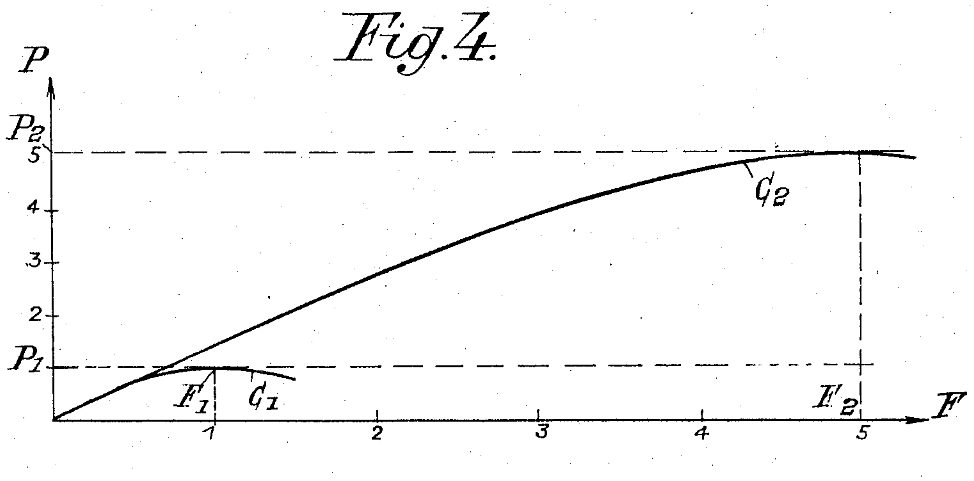
FIG. 4 is a diagram illustrating the thrust advantage of the invention.

This is disclosed by the curve of FIG. 4, which is a diagram where the flow rates per unit of time of the fluid component are plotted in abscissas and the thrusts are plotted in ordinates. Curve $C_1$ corresponds to the absence of a diaphragm and it shows that, when the flow rate of the fluid component is increased above a value $F_1$, the thrust, after reaching a maximum value $P_1$, then decreases and may even tend toward very low values.

On the contrary, with a single diaphragm such as 6*a*, the flow rate of the fluid component may be increased up to much higher values (for instance of the order of five times what it would be without diaphragm) and the thrust is also increased in the same proportions without appearance of the unstabilities and drawbacks above mentioned. This is illustrated by curve $C_2$ which shows that we reach a thrust $P_2$ above five times greater than $P_1$, thus giving a flow rate $F_2$ equal to five times the flow rate without a diaphragm.

Figure 10:
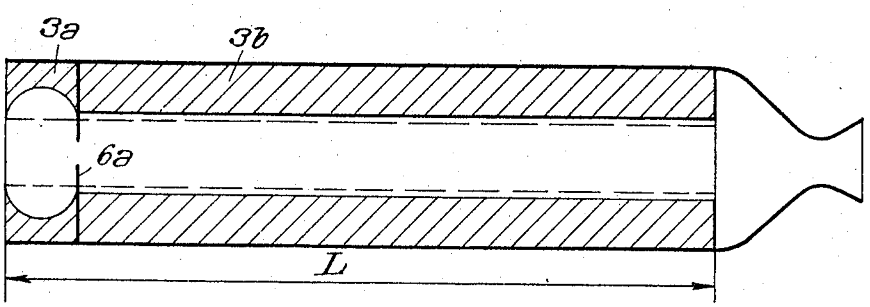
FIG. 10 is a diagrammatic axial section illustrating consumption of the solid fuel for a given position of the diaphragm.
Figure 11:
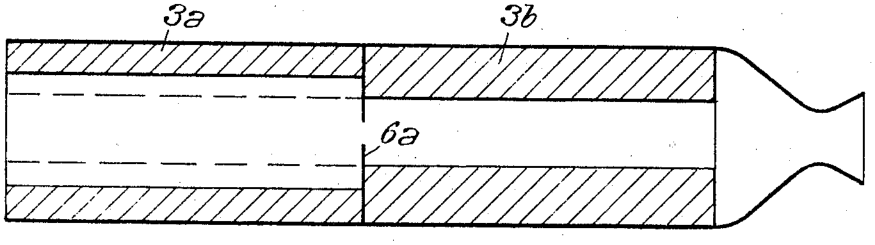
FIG. 11 is a diagrammatic axial section illustrating consumption of the solid fuel for another position of the diaphragm.
Figure 12:
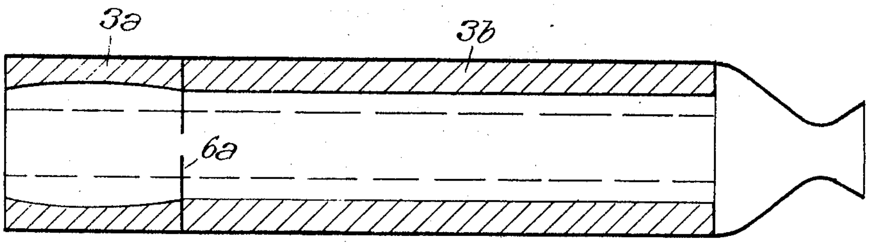
FIG. 12 is a diagrammatic axial section illustrating consumption of the solid fuel for still another position of the diaphragm.

FIGS. 10, 11 and 12 diagrammatically represent the variation of the consumption of solid component for the same flow rate of fluid component corresponding to flow rate $D_2$, in a hypergolic hybrid rocket engine provided with a single perforated diaphragm 6*a* on either side of which are two portions 3*a* and 3*b* of the solid component (both portions being of the same composition) having a total length equal to L.

All other things being equal, the only difference between these three cases is concerned with the longitudinal position of perforated diaphragm 6*a*, which is located at a distance from the upstream end of the solid component of the order of 0.10 L in FIG. 10 of 0.50 L in FIG. 11 and of 0.25 L in FIG. 12.

Figure 8:
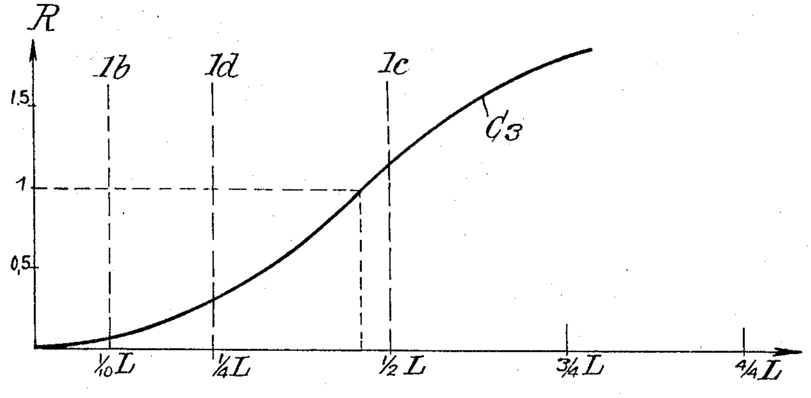
FIG. 8 is a diagram illustrating the mean mixture ratio variation as a function of the longitudinal position of a perforated diaphragm.
Figure 9:
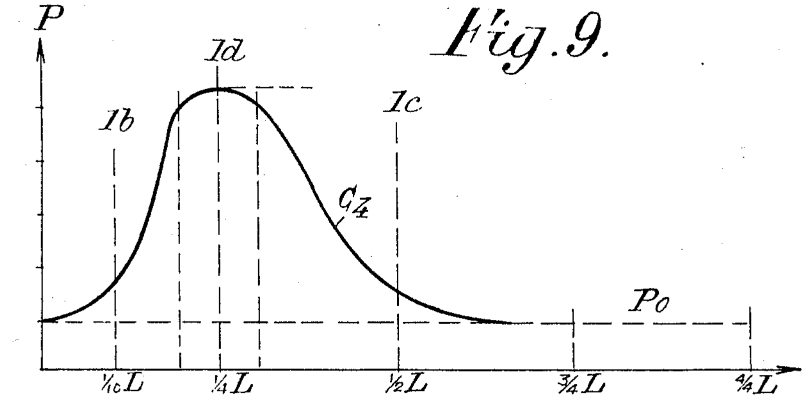
FIG. 9 is a diagram illustrating the variation of thrust as a function of the longitudinal position of a perforated diaphragm.

FIG. 8 is a diagram showing, for the same flow rate $D_2$ of fluid component, the evolution (curve $C_3$) of the characteristic mean mixture ratio R in the stream flowing past perforated diaphragm 6*a* as a function of the longitudinal position of this diaphragm. It is reminded that the "characteristics mean mixture ratio" is the quotient of the mean mixture ratio (ratio of the fuel to the oxidizer) in the stream by the stoichiometric mixture ratio. Finally, FIG. 9 is a diagram showing, still for the same flow rate $D_2$ of fluid component, the evolution (curve $C_4$) of the thrust as a function of the longitudinal position of perforated diaphragm 6*a*.

In the case corresponding to FIG. 10 (diaphragm 6*a* at about 0.10 L from the upstream end of the solid component) we found that, upstream of diaphragm 6*a*, the consumption of the solid component 3*a* is very high, whereas, on the contrary, downstream of diaphragm 6*a*, the consumption of the downstream portion 3*b* is very small. In this case we already note a substantial increase of the thrust, as shown, on the curve $C_4$ of FIG. 9 by the point corresponding to the position of the screen at 0.10 L from the upstream end of the solid component. This operation seems to result from the fact that the stream passing through diaphragm 6*a* thus disposed is very rich in oxidizer, as shown, on the curve $C_3$ of FIG. 8, by the point corresponding to the position of the screen at distance 0.10 L from the upstream end of the solid component.

In the case corresponding to FIG. 11 (diaphragm 6*a* at about 0.50 L from the upstream end of the solid component) we found that, upstream of diaphragm 6*a*, the consumption of the upstream portion 3*a* is still very high, whereas, on the contrary, the downstream consumption (at 3*b*) is very small. In this case there is also noted a substantial increase of the thrust as shown, on the curve $C_4$ of FIG. 9, by the point corresponding to the position of the diaphragm at 0.50 L.

This operation seems to result from the fact that the stream passing through diaphragm 6*a* in this position is very rich in fuel as shown, on the curve $C_3$ of FIG. 8, by the point corresponding to the position of the diaphragm at 0.50 L from the upstream end of the solid component.

Finally, in the case corresponding to FIG. 12 (diaphragm 6*a* at about 0.25 L) we found that, upstream of diaphragm 6*a*, the consumption of portion 3*a* is still very high and that, this time, downstream of diaphragm 6*a*, the consumption of portion 3*b* is also very high. In this case we note an increase of the thrust much higher than in the preceding cases and which constitutes a maximum value $P_2$ as shown, on the curve $C_4$ of FIG. 9, by the point corresponding to the position of the diaphragm at a distance of 0.25 L.

This operation seems to result from the fact that the stream flowing through diaphragm 6*a* in this position is of a composition and of a richness in oxidizer particularly suitable for the combustion of the downstream portion 3*b*, as shown, on the curve $C_3$ of FIG. 8, by the point corresponding to the position of the diaphragm at 0.25 L from the upstream end of the solid component.

It should be noted that, as indicated by the curve $C_4$ of FIG. 9, the diaphragm may be moved substantially away from the optimum position on both sides thereof while preserving a thrust having a value close to its maximum value $P_2$, i.e. from about 0.2 to 0.3 L and a substantially improved thrust over value $P_0$ from about 0.1 to 0.5 L.

The three cases above considered show that, in all cases, the diaphragm acts upon the consumption of solid component upstream of said diaphragm and, consequently upon the mixture ratio of the stream flowing through this diaphragm. According to the longitudinal position of said diaphragm the value of said ratio is such as to influence the consumption of solid component downstream of the diaphragm permitting the securing of greater maximum thrusts.

It should be noted that when the solid component portions 3*a* and 3*b* are made of different respective compositions, the action of the diaphragm is reinforced by the choice of a more reactive solid component for the upstream portion 3*a*.

Figure 5:
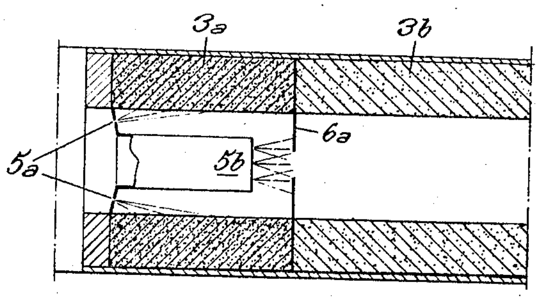
FIG. 5 is a diagrammatic axial section of another embodiment.
Figure 6:
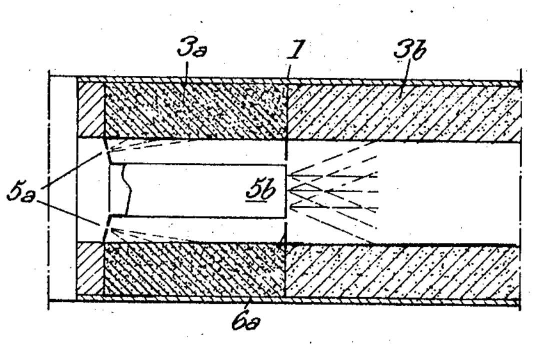
FIG. 6 is a diagrammatic axial section of another embodiment.
Figure 7:
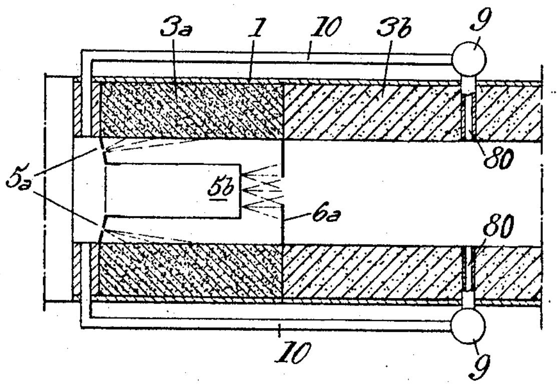
FIG. 7 is a diagrammatic axial section of another embodiment.

According to still another feature of the invention, illustrated by FIGS. 5–7, instead of injecting the oxidizer exclusively at the upstream end of central conduit 4, only a portion of the oxidizer is introduced through an injection device 5*a* at said upstream end of central conduit 4 and the remainder is introduced, by means of at least one injection device 5*b*, into an intermediate zone of said conduit 4.

This arrangement permits in particular of avoiding saturation of the upstream end region of conduit 4 with the oxidizer. It is advantageous in this case to inject at the upstream end at most one-half and preferably one-third of the total amount of oxidizer.

On the other hand, it will be advantageous, according to another feature of the invention, to perform the other injection or injections of oxidizer in the vicinity of a diaphragm provided in conduit 4 and preferably in the vicinity of the first diaphragm 6*a*, said other injection or injections taking place for instance in the downstream direction.

This second oxidizer injection, which is concerned with a zone downstream of the diaphragm in question, for instance 6*a*, may take place either slightly upstream of said diaphragm 6*a* (case of FIG. 5), or substantially at the level of said diaphragm 6*a* (case of FIG. 6), and possibly downstream thereof for instance, as shown at 8, at a relatively considerable distance as shown by FIG. 7.

In a general manner this supplementary injection may be obtained, by means of an annular row of injectors projecting into central conduit 4, or by an injection ring disposed in said conduit, or again, according to a particular feature of the present invention illustrated by FIG. 7, by means of radial conduits 80 extending through the mass of solid component 3*b* and made of a material which is destroyed at the same time as said solid component, such a material being for instance a plastic material. Said radial conduits 80 are fed with oxidizer either individually or collectively from an external main 9 itself fed through one or several conduits 10.

It should be noted that when there is a supplementary injection of oxidizer at a substantial distance downstream of diaphragm 6*a*, it is advantageous, as shown by FIG. 7 to provide another injection in the vicinity of said diaphragm 6*a* (a little upstream thereof, at the level thereof, or a little downstream thereof).

According to another feature of our invention, at least the solid component 3*a* in zone I is chosen to have a delay of ignition as short as possible, which is the case in particular of TAF 5050 (consisting of 50% of triethylaluminum and 50% of polystyrene) and other components which contain metallic hydrides or amides.

It should be pointed out that, if in zone I, the solid component 3*a* is very highly hypergolic with the fluid component and has a very short delay of ignition it is possible to provide, downstream of diaphragm 6*a*, in zone II, a different solid component less hypergolic with the fluid component than the solid component 3*a*, but having however a short delay of ignition with respect to the stream flowing out from zone I.

A solid fuel component suitable for zone II is for instance PTC 8515 consisting of 85% of paratoluidine and 15% of paste X, or possible PTC 7030 consisting of 70% of paratoluidine and 30% of paste X.

By way of example, a fuel block made of two portions 3*a* and 3*b* of respective compositions such as above stated may be used, as shown by FIG. 1*a*, without a diaphragm.

If there is a second diaphragm 6*b*, downstream of this diaphragm, there is a third zone III (FIG. 2) wherein the solid component 3*c*, is still less reactive with respect to the fluid component (it may even not be hypergolic with respect to this fluid component) while having a short delay of ignition with respect to the stream issuing from zone II.

By way of example of a combination of the above stated solutions, it may be indicated that satisfactory conditions, both from the point of view of efficiency and from that of stability of combustion, were obtained, in the case where the oxidizer is nitric acid, the decomposition products of which are chiefly $O_2$, NO and $NO_2$, by using:

(a) in zone I, TAF 5050, which is very reactive with respect to the liquid phase oxidizer, said zone I extending preferably over a length ranging from ¼ to ⅓ of L;

(b) in zone II, PTC 8515 or PTC 7030, particularly reactive with the stream issued from zone I, this zone zone II extending preferably over a length ranging from ⅘ to ⅚ of the remainder of the solid component; and (c) in zone III, a solid component having a sufficiently short delay of ignition with respect to the stream issuing from zone II, such as polyvinyl chloride with the addition of an amine.

According to still another feature of our invention, in order to obtain an increased thrust and a more stable combustion, at least the solid component 3*a* in zone I contains a relatively volatile hypergolic constituent.

Examples of solid components complying with this condition are, in the case where the solid component is a fuel:

(a) PTC 9010 consisting of 90% of paratoluidine and 10% of paste X (10% of polyvinyl chloride with the addition of a plasticizer as above), and
(b) PTC 9505 consisting of 95% of paratoluidine and 5% of paste X.

We have also discoverd that it is possible, by means of modified perforated diaphragms, to obtain still better results, and, in particular to increase the rate of consumption in weight of the lithergol, which permits, by increasing the flow rate of oxidizer and without modifying the other conditions, either of substantially increasing the thrust of the rocket motor or of reducing its length, some of said new arrangements further permitting of greatly reducing the residual portion of lithergol left at the end of combustion.

Figure 13:
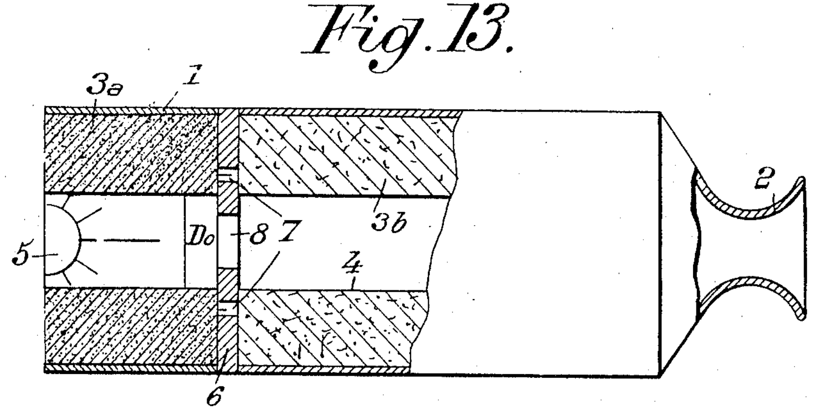
FIG. 13 is an axial view, partly in section, of another embodiment.
Figure 14:
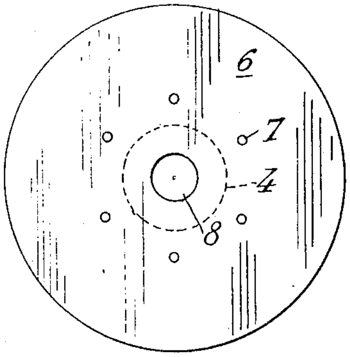
FIG. 14 is a plan view of the perforated diaphragm of the rocket of FIG. 13.

As shown in FIG. 13, there is disposed, in central channel 4, at some distance from the upstream end of combustion chamber 1, and preferably at the level of the surface of junction of two successive lithergols 3*a* and 3*b* of different respective compositions, at least one transverse perforated diaphragm 6 extending for instance as far as the inner wall of chamber 1, to which it is fixed, and, according to the main feature of the present invention, illustrated by FIGS. 13 and 14, said diaphragm is provided with a plurality of perforations 7 distinct from one another and located at a distance from the axis of the motor, said perforations being preferably distributed at regular intervals to form a circular row.

These perforations are intended to produce as many hot fluid jets improving the combustion of the lithergol 3*b* located downstream of diaphragm 6. It may be advantageous to cause the action of said perforations 7 to take place, or to reach its full effect, only some time after the beginning of combustion. Such results may be obtained by giving the row of perforations 7 a diameter such that said perforations are located either wholly or partly in the lithergol before the beginning of combustion and are brought into play only as said lithergol is being consumed.

Thus, if $S_0$ is the total area of the perforations provided in diaphragm 6, there is an "initial flow cross-section" $S_1$ (flow cross-section through perforated diaphragm 6 before combustion has begun) this initial cross-section $S_1$ being at most equal to $S_0$. This initial flow area may be constituted by the whole or a part of perforations 7 and/or by one or several other orifices which will be hereinafter referred to.

Anyway the initial flow cross-section $S_1$ should comply with the following relation:

(7) $S_1$ is from 0.10 to 6.5 $A_0$ wherein $A_0$ designates the cross-section area of the neck of nozzle 2.

Concerning now the number, the dimensions and the eccentricity of perforations 7, they are chosen, in particular, on the one hand in accordance with the total area $S_0$ to be obtained (account being taken of the possible presence of one or several perforations other than perforations 7) and, on the other hand, in accordance with the diameter of the circular row of said perforations 7, that is to say of the diameter $D_0$ of the circumference passing through the centers of said perforations.

It will be necessary to take into account the mechanical and thermal resistance of the material of which diaphragm 6 is made (for instance a stratified material consisting of asbestos or silica impregnated with a phenol resin) and to determine the number, dimensions and positions of perforations 7 in such manner as not dangerously to weaken diaphragm 6 by the provision of said row of holes 7.

Thus, if the row of perforations 7 comprises *n* identical circular perforations the diameter of each of which is $d_0$, it will be of advantage to choose parameters $n$, $d_0$ and $D_0$ (diameter of the row of orifices) in such manner that said parameters comply with the following relation:

(8) $nd_0 \leqslant 1/2\pi D_0$

On the other hand, it will be possible to improve the mechanical or thermal behavior of the diaphragm by cooling it by a circulation of fluid therethrough, or by the formation thereon of an external cooling film, the material of which the diaphragm is made being then advantageously metallic.

The case illustrated by FIGS. 13 and 14 will first be examined. In this case diaphragm 6 is provided with a circular row of perforations 7 completely embedded in the lithergol before the beginning of combustion, so that it is necessary to provie at least one complementary perforation, for instance a central one 8.

In this case it is the cross-section of this central perforation 8 (and perforations shown in FIGS. 1, 2, 5–7 and 10–12) that must comply with relation (7) in view of the fact that the cross-section of the central orifice constitutes the whole initial passage of cross-section $S_1$.

By way of example, it may be indicated that, for a diameter of combustion chamber 1 equal to 300 mm., a diameter of the neck of nozzle 2 equal to 60 mm. (area of 2830 mm.$^2$) and a diameter of central channel 4 equal to 100 mm., it is possible to use a perforated diaphragm 6, the central perforation 8 of which has a cross-section area of 1260 mm.$^2$ (diameter of 40 mm.), perforations 7, the number of which is six being distributed along a circle having a diameter of 115 mm., said perforations 7 having an individual area of 19.6 mm.$^2$ (diameter of 5 mm.), the total surface of the perforations being therefore 196 mm.$^2$.

Figure 15:
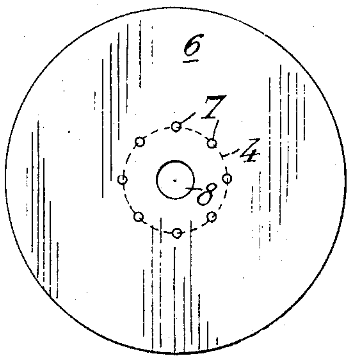
FIGS. 15 to 21 are plan views of respective modified diaphragms.

According to an embodiment illustrated by FIG. 15, perforated diaphragm 6 is arranged in such manner that perforations 7 are only partly embedded in the lithergol, the initial flow cross-section $S_1$ consisting of the unmasked portions of said perforations 7 and of a central perforation 8, the diameter of which may be smaller than that of the perforation 8 of the preceding case.

Figure 16:
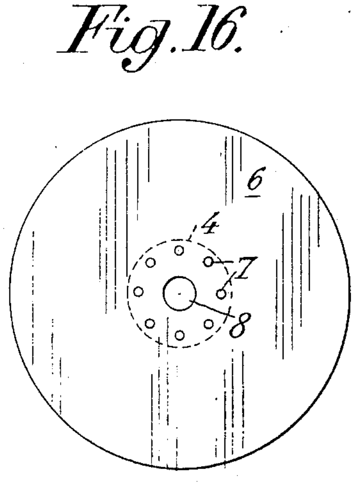

According to another embodiment, illustrated by FIG. 16, perforations 7 are completely unmasked at the beginning of combustion and the initial flow cross-section $S_1$ consists of the sum of the individual cross-sections of said perforations and of the cross-section of a central perforation 8 still smaller than in the preceding case.

Figure 17:
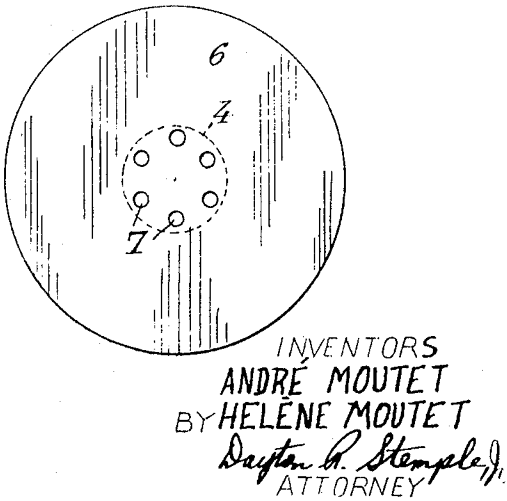

According to another embodiment, illustrated by FIG. 17, the circular row of perforations 7 is wholly unmasked at the beginning of combustion and the dimensions and the number of said perforations are such that the total of their individual cross-sections, which constitutes the initial flow cross-section $S_1$, complies with relation (7). In this case, the circular row of perforations 7 constitutes the only perforations provided in diaphragm 6.

Figure 18:
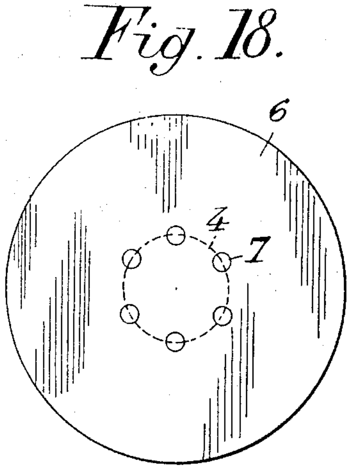

In the modification of FIG. 18 the cross-section of perforations 7 is further increased and these perforations are partly located inside the solid ergol so that the sum of the free areas of said perforations is sufficient to constitute the initial cross-section area $S_1$ which is to comply with relation (7).

Figure 19:
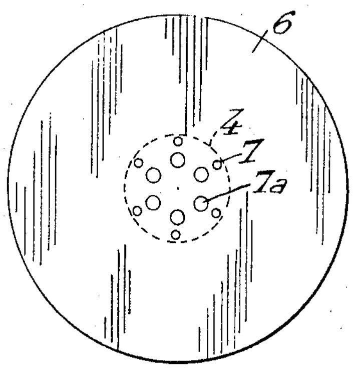

FIG. 19 shows still another embodiment of perforated diaphragm 6 wherein the row of perforations 7 is wholly unmasked at the beginning of the combustion but has a total area insufficient for complying with relation (7), the supplementary passage necessary at the beginning of the combustion then consisting, not of a central perforation, but of a circular row of perforations 7*a*, the diameter of said last mentioned row being smaller than that of the circular row of perforations 7.

Figure 20:
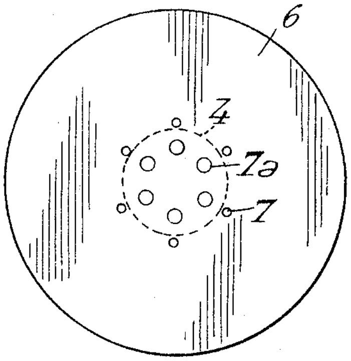

According to the embodiment illustrated by FIG. 20, the row of perforations 7 is located wholly inside the lithergol before the beginning of the combustion and the initial passage cross-section $S_1$ is supplied by a row of perforations *7a*, the total area of which complies with relation (7).

Figure 21:
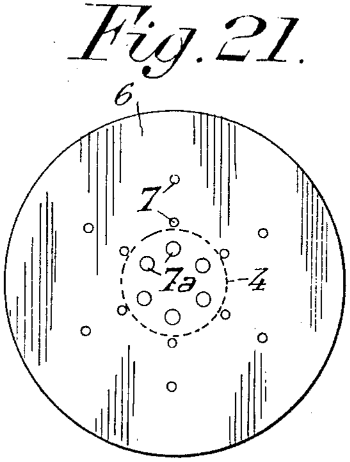

Of course there might be provided, as shown by FIG. 21, more than two circular rows of perforations, for instance three rows, the external row of perforations 7 being initially located inside the solid ergol and the inner row *7a* being initially open, whereas an intermediate row (also designated by reference numeral 7) is initially located inside the mass of solid ergol.

On the other hand, the axes of perforations 7, instead of being parallel to the general axis of the rocket motor, might have a double obliquity, both longitudinal and transverse, so as to give the gaseous stream a helical movement.

It has been stated above that the initial cross-section $S_1$ must comply with relation (7). To this first condition there should be added another one, relative to an upper limit of the total area of the perforations $S_0$ of screen 6. This relation is as follows:

$$S_0 \leqslant 6.5 \cdot A_0 \quad (9)$$

$A_0$ still designating the cross-section of nozzle 2 at the throat thereof.

Anyway, whatever be the particular embodiment that is chosen, the row of perforations 7 ensures, at least after an initial period of combustion, an advantageous effect due to the hot gas jets issuing from said perforations 7.

It should be noted that, according to the modifications of the invention, either all the perforations of the diaphragms are cleared by the solid component prior to ignition,
or at least one of these perforations is partly embedded in the solid component prior to ignition,
or again, at least one of these perforations is wholly embedded in the solid component prior to ignition.

In the first case, the conditions setting the limits between which must be comprised the sum of the cross-section areas of flow through the diaphragm, for instance relation (7), effectively applies to the sum of the areas of the perforations of the diaphragm.

But in the two other cases the upper limit for said cross sections of flow still is the sum of the areas of the perforations of the diaphragm, but the lower limit condition applies to the sum of the cross-sections of flow left clear by the solid component in said perforations before ignition.

It should be noted that the perforations provided in the diaphragm which, in the preceding examples, were in the form of either a central hole or of one or several rows of holes may also be in the form of an annular opening.

Figure 22:
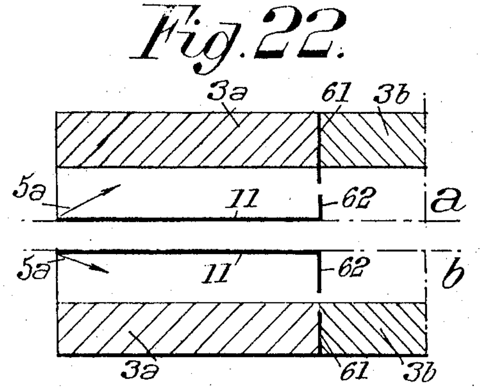
FIGS. 22 and 23 are, respectively, an axial section and a cross section of a modification.
Figure 23:
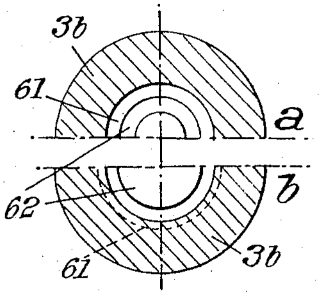

FIGS. 22 and 23 show, respectively in longitudinal section and in cross-section, an embodiment of the invention where the diaphragm is provided with an annular perforation. This diaphragm comprises a peripheral portion 61 carried by casing 1 and a central portion 62 carried by a rod 11 secured to the end face of casing 1

In this embodiment of the invention the solid component *3a*, *3b* is provided with a central channel for the fluid component injected at *5a*.

Figure 24:
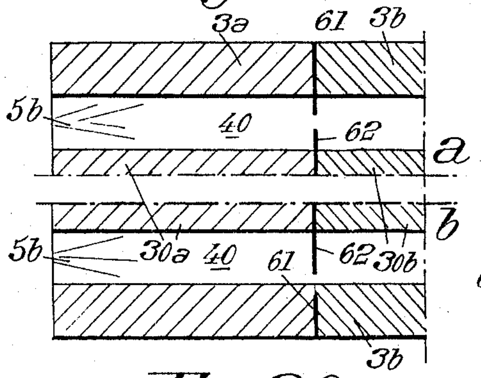
FIGS. 24–25 and 26–27 are views similar to FIGS. 22–23 but corresponding to other modifications.
Figure 25:
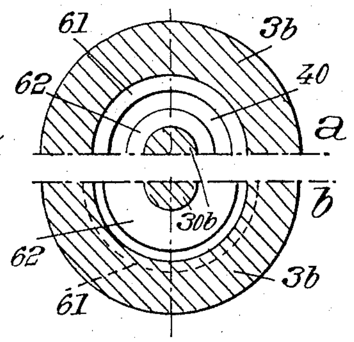

FIGS. 24 and 25 similarly show another embodiment wherein the diaphragm is also provided with an annular perforation. But in this case the solid component comprises a peripheral portion *3a*, *3b* and a central portion *30a–30b* defining between them an annular conduit 40 into which open the fluid component injecting means *5b*.

The fluid component is injected at *5b* into the annular conduit 40.

In each of said FIGS. 22–23 and 24–25, indexes *a* and *b* correspond to two different embodiments. Index *a* corresponds to the case where, prior to ignition, the annular orifice is wholly clear, whereas index *b* corresponds to the case where, prior to ignition, the annular orifice is partly obturated by the solid component.

If the diaphragm comprises, in addition to the annular opening, at least one other opening cleared before ignition, the annular opening may initially, be entirely embedded in the solid component.

The above stated remarks concerning the upper and lower limit conditions for the cross-section area of flow through a diaphragm provided with a plurality of perforations also apply to the case of diaphragms provided with an annular perforation, such as illustrated by FIGS. 22–23 and 24–25.

Figure 26:
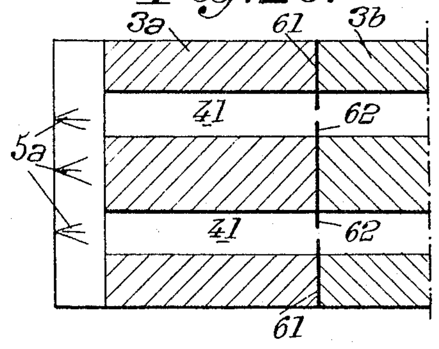
Figure 27:
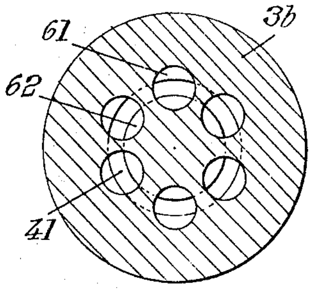

FIGS. 26 and 27 are views, similar to FIGS. 24 and 25 respectively, showing still another embodiment wherein the diaphragm 61, 62 is the same as in said FIGS. 24 and 25, but the solid component, instead of consisting of two portions *3a–3b* and *30a–30b* leaving between them an annular conduit 40, consists of a block *3a–3b* provided with a plurality of longitudinal conduits 41.

In the embodiment of FIGS. 26–27 the fluid component is injected at *5a* into a chamber 42 communicating with all the conduits 41. But, of course, the solid component block *3a* might extend toward the left as far as the end wall of the chamber and individual fuel component feeding means would then be provided in said end wall to open into said conduits 41 respectively.

Figure 28:
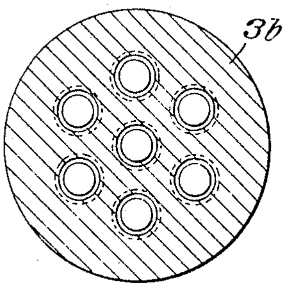
FIG. 28 is an end view of an example including a multiplicity of longitudinal conduits.

FIG. 28 shows a solid component block provided with several longitudinal conduits and with a diaphragm provided, for each of said channels with an arrangement analogous to that used in the example of FIGS. 24*b* and 25*b*.

We will now give comparative examples showing the advantage resulting from the provision of diaphragms herein described, all these examples relating to rocket engines of the type illustrated by FIG. 1.

EXAMPLE I

*(Solid fuel and fluid oxidizer components)*

$L$=1150 mm., $D$=120 mm. and $D_c$=40 mm.

(a) Without diaphragm.

The arrangement is similar to that of FIG. 1 with the difference that, on the one hand, there is no diaphragm such as *6a*, and on the other hand, the same solid fuel component extends from one end of combustion chamber 1 to the other end thereof. The solid fuel component consists of PTC 8515 consisting of 85% of paratoluidine and 15% of paste X (10% of polyvinyl chloride with the addition of a plasticizer such as butyl phthalate). The fluid component injected at 5 is pure nitrogen peroxide $N_2O_4$.

In this conditions with an injection of oxidizer of 297.4 g. per second a jet having a thrust of 430 decanewtons is obtained for 180 seconds. If the flow rate that is injected is increased the thrust decreases and unstability appears.

(b) With a diaphragm, i.e., according to the invention.

The arrangement is that of FIG. 1, with the length of portion I equal to 320 mm., L being still equal to 1150 mm. The diameter Da of the perforation in diaphragm *6a* is 55 mm. The solid fuel in chamber II is PTC 8515. That in chamber I is PTC 9505 (i.e. comprising the same elements as PTC 8515, but with 95% of paratoluidine and 5% of paste X). The fluid component injected at 5 is pure nitrogen peroxide $N_2O_4$.

In this case, if 899 g. per second of oxidizer is injected, there is obtained, for 54 seconds, a stable thrust of 1360 decanewtons, that is to say three times what it was in the preceding case.

EXAMPLE II

*(Solid oxidizer and fluid fuel components)*

Total length=120 mm., *D*=8 mm., and *Dc*=5 mm.

The solid oxidizer component is $N_2O_4$ kept at a temperature of −30° C. (freezes at −11° C.). The fluid fuel component is dimethylhydrazine.

(a) Without diaphragm.

For a flow rate of dimethylhydrazine of 12 g. per second, we obtain for 20 seconds a thrust of 7 decanewtons. If the flow rate that is injected is increased the thrust decreases and unstability appears.

(b) With diaphragm.

With the same rocket motor provided with a diaphragm located so that the length of portion I is equal to 30 mm., the diameter D*a* of the perforation in said screen being 7 mm., if 30 g. per second of dimethylhydrazine are injected, we obtain for 7 seconds a stable thrust of 17 decanewtons, that is to say about two and one-half times the thrust of the preceding case.

The advantageous results obtained with a plurality of perforations in a single diaphragm led to the following examples.

EXAMPLE III

Two identical rocket motors having identical cylindrical lithergol blocks of the same composition, of the same dimensions [length, external diameter, initial diameter (100 mm.) of the central channel, and throttle neck diameter (40 mm.)] and working with the same oxidizer fluid at a mean pressure in the combustion chamber of the same order of magnitude, consequently with a flow rate of oxidizer fluid also of the same order of magnitude.

One of these rocket motors was fitted with a diaphragm similar to FIG. 1 with a single central perforation of 40 mm. diameter.

The other rocket motor was fitted with a diaphragm similar to FIG. 14, i.e. in addition to the central perforation of 40 mm. diameter, having a circular row of twelve perforations (of a diameter of 7 mm.) with their centers distributed at equal distances from one another along a circumference of a diameter of 103.5 mm. concentric with the central perforation, whereby said twelve perforations were initially embedded in the lithergol, being tangent to the central channel and very quickly unmasked as soon as the rocket motor operation was started.

It was found, in these conditions, that the flow rate by weight of lithergol per kilogram of mean pressure in the combustion chamber was, in the rocket motor provided with a diaphragm according to FIG. 14, higher by 24% than that of the rocket motor fitted with a diaphragm of FIG. 1.

EXAMPLE IV

In this case the comparison was between three identical rocket motors, that is to say motors making use of identical cylindrical lithergol blocks [same composition, same dimensions, to wit length, external diameter, diameter (100 mm.) of the central channel, and same throttle neck diameter (60 mm.)] and working with the same oxidizer fluid at a mean pressure in the combustion chamber of the same order of magnitude, consequently with a flow rate of oxidizer fluid of the same order of magnitude.

But one of these rocket motors was provided with a diaphragm according to FIG. 1 with a single central orifice (40 mm. diameter).

Another of these motors was fitted with a diaphragm comprising, according to FIG. 14, a central perforation (35 mm. diameter), and a circular row of ten perforations (5 mm. diameter) inclined at 15°, having their centers distributed at equal intervals along a circumference of a diameter equal to 102.5 mm. concentric with the central perforation, whereby said ten perforations were initially embedded in the lithergol.

As for the third motor it was fitted with another diaphragm according to FIG. 20 where the outer row of perforations was similar to that used for the second motor and where the inner row of perforations was a circular row of six orifices (13.8 mm. diameter) inclined at 15°, having their centers distributed at equal distances along a circumference of a diameter of 70 mm., whereby the perforations of said inner row opened into the central channel and were not embedded in the lithergol.

It was found that the rate of consumption of lithergol by weight, per kilogram of mean pressure in the combustion chamber was:

For the second motor (provided with a central perforation and with a circular row of perforations concentric with said central perforation) higher by 33% than that of the first rocket motor (fitted with only a central perforation) and for the third rocket motor (provided with two rows of perforations) the inner one opening into the central channel higher by 63% than that of the first rocket motor.

EXAMPLE V

This test was a comparison between two identical rocket motors having respective diaphragms provided with different kinds of perforation arrangements.

It was found that the rocket motor having a diaphragm of the third of that of FIG. 20 with a central row of six perforations (diameter 12.5 mm.), inclined at 15°, having their centers disposed at equal intervals from one another along a circumference of a diameter of 70 mm. and therefore opening into the initial central channel (of a diameter equal to 100 mm.) and with a second circular row of twelve perforations (diameter 4.5 mm.) inclined at 15°, having their centers distributed at equal distances from one another along a circumference of a diameter of 110 mm. and therefore all initially embedded in the lithergol, had a rate of consumption, by weight of lithergol per kilogram of means pressure in the combustion chamber higher by 40% than that of the other rocket motor, which was fitted with a diaphragm of the kind of that of FIG. 14 having in addition to a central perforation of 30 mm. diameter, a circular row of ten perforations (diameter 15 mm.) inclined at 15°, distributed at equal intervals along a circumference having a diameter of 102.5 mm. and therefore initially embedded in the lithergol.

According to the invention, all the features described for the case where combustion takes place, for instance, in a single longitudinal cylindrical conduit, apply also to lithergols where combustion takes place either in a plurality of longitudinal conduits (either cylindrical or annular), or in an annular longitudinal conduit.

Thus, for lithergols comprising a multiplicity of longitudinal conduits, it is possible to apply to these respective conduits the features described, either for a single longitudinal cylindrical conduit, or for annular conduits.

Of course, the constructions and features herein stated are given merely by way of example and have no limitative character, particularly the cylindrical and circular disclosure of elements and perforations which could obviously take other shapes.

What we claim is:

1. A high velocity gas stream generator which comprises, in combination, a reaction chamber having a nozzle at the rear end thereof, at least two solid component portions housed in said chamber and one of which, called downstream portion, is nearer to said nozzle than the other, called upstream portion, said solid component portions forming at least one longitudinal passage in communication with said nozzle, the end of said passage adjoining said nozzle being called the passage downstream end and the other end of said passage being called the passage upstream end, two longitudinally spaced means for injecting into said passage at least one fluid component hypergolic with at least said upstream solid component portion to produce a gas stream flowing toward said nozzle, one of said fluid component injecting means being located near the upstream end of said passage, the upstream solid component portion having with respect to the fluid component injected thereon a delay of ignition shorter than the downstream solid component portion with respect to said fluid component, and a diaphragm provided with a perforation and fixed transversely intermediate the ends of said passage, said diaphragm being substantially resistant to the thermal and erosive activity in said passage, said perforation being located at least partly in said passage and being dimensioned and positioned to increase the time for which the fluid stream remains upstream of said diaphragm so as to increase the thrust of said generator.

2. A high velocity gas stream generator which comprises, in combination, a reaction chamber having a nozzle at the rear end thereof, at least two solid component portions housed in said chamber and one of which, called downstream portion is nearer to said nozzle than the other, called upstream portion, said solid component portions forming at least one longitudinal passage in communication with said nozzle, the end of said passage adjoining said nozzle being called the passage downstream end and the other end of said passage being called the passage upstream end, two longitudinally spaced means for injecting into said passage at least one fluid component hypergolic with at least said upstream solid component portion to produce a gas stream flowing toward said nozzle, one of said fluid component injecting means being located near the upstream end of said passage, the upstream solid component portion having with respect to the fluid component injected thereon a delay of ignition shorter than the downstream solid component portion with respect to said fluid component, and a diaphragm provided with a perforation and fixed transversely intermediate the ends of said passage, said diaphragm being substantially resistant to the thermal and erosive activity in said passage, said perforation being located at least partly in said passage, the area of said perforation being smaller than 6.5 of the area of the neck of said nozzle, the area and the position of said perforation with respect to the solid component, before ignition, defining an open area greater than 0.10 of the area of the nozzle neck, the distance of said diaphragm from the upstream end of said passage ranging from 0.1 to 0.5 of the total length of said passage.

3. A high velocity gas stream generator which comprises, in combination, a reaction chamber having a nozzle at the rear end thereof, at least two solid component portions housed in said chamber and one of which, called downstream portion, is nearer to said nozzle than the other, called upstream portion, said solid component portions forming at least one longitudinal passage in communication with said nozzle, the end of said passage adjoining said nozzle being called the passage downstream end and the other end of said passage being called the passage upstream end, and two longitudinally spaced means for injecting into said passage at least one fluid component hypergolic with at least said upstream solid component portion to produce a gas stream flowing toward said nozzle, one of said fluid component injecting means being located near the upstream end of said passage, the upstream solid component portion having with respect to the fluid component injected thereon a delay of ignition shorter than the downstream solid component portion with respect to said fluid component.

4. A high velocity gas stream generator which comprises, in combination, a reaction chamber having a nozzle at the rear end thereof, at least two solid component portions housing in said chamber in respective portions thereof and one of which, called downstream portion, is nearer to said nozzle than the other, called upstream portion, said solid component portions forming at least one longitudinal passage in communication with said nozzle, the end of said passage adjoining said nozzle being called the passage downstream end and the other end of said passage being called the passage upstream end, means for injecting into said passage a fluid component hypergolic with said solid component portions to produce a gas stream flowing toward said nozzle, said fluid component injecting means being located near the upstream end of said passage, the upstream solid component portion having with respect to the fluid component injected thereon a delay of ignition shorter than the downstream solid component portion with respect to said fluid component, and a diaphragm provided with a perforation and fixed transversely intermediate the ends of said passage, said diaphragm being substantially resistant to the thermal and erosive activity in said passage, said perforation being located at least partly in said passage, the area of said perforation being smaller than 6.5 of the area of the neck of said nozzle, the area and the position of said perforation with respect to the solid component, before ignition, defining an open area greater than 0.10 of the area of the nozzle neck, the distance of said diaphragm from the upstream end of said passage ranging from 0.1 to 0.5 of the total length of said passage.

5. A high velocity gas stream generator which comprises, in combination, a reaction chamber having a nozzle at the rear end thereof, at least one solid component housed in said chamber and forming at least one longitudinal passage in communication with said nozzle, two longitudinally spaced means for injecting into said passage at least one fluid component hypergolic with said solid component to produce a gas stream flowing toward said nozzle, one of said fluid component injecting means being located near the upstream end of said passage, and a diaphragm provided with a perforation and fixed transversely intermediate the ends of said passage, said diaphragm being substantially resistant to the thermal and erosive activity in said passage, said perforation being located at least partly in said passage, the area of said perforation being smaller than 6.5 of the area of the neck of said nozzle, the area and the position of said perforation with respect to the solid component, before ignition, defining an open area greater than 0.10 of the area of the nozzle neck, the distance of said diaphragm from the upstream end of said passage ranging from 0.1 to 0.5 of the total length of said passage.

6. A high velocity gas stream generator which comprises, in combination, a reaction chamber having a nozzle at the rear end thereof, at least two solid components housed in said chamber in respective portions thereof and one of which, called downstream portion, is nearer to said nozzle than the other, called upstream portion, said solid components forming at least one longitudinal passage in communication with said nozzle, the end of said passage adjoining said nozzle being called the passage downstream end and the other end of said passage being called the passage upstream end, means for injecting into said passage a fluid component hypergolic with said solid components to produce a gas stream flowing toward said nozzle, said fluid component injecting means being located near the upstream end of said passage, the upstream solid component portion having with respect to the fluid component injected thereon a delay of ignition shorter than the downstream solid component portion with respect to said fluid component.

7. A high velocity gas stream generator which comprises, in combination, a reaction chamber having a nozzle at the rear end thereof, at least one solid component housed in said chamber forming at least one longitudinal passage in communication with said nozzle, means for injecting into the upstream portion of said passage a fluid component hypergolic with said solid component to produce a gas stream flowing toward said nozzle, a diaphragm provided with a perforation and fixed transversely intermediate the ends of said passage, said diaphragm being substantially resistant to the thermal and erosive activity in said passage, said perforation being located at least partly in said passage, the area of said perforation being smaller than 6.5 of the area of the neck of said nozzle, the area and the position of said perforation with respect to the solid component, before ignition, defining an open area greater than 0.10 of the area of the nozzle neck, the distance of said diaphragm from the upstream end of said passage ranging from 0.1 to 0.5 of the total length of said passage.

8. The generator of claim 7 wherein said longitudinal passage and said perforation are centered within said solid component and said diaphragm respectively.

9. The generator of claim 7 comprising additionally another perforated diaphragm downstream of said first mentioned diaphragm.

10. The generator of claim 9 wherein said other diaphragm has a larger perforation than said first mentioned diaphragm and is located downstream of first mentioned diaphragm 0.1 to 0.4 of the total length of said passage.

11. The generator of claim 7 wherein said diaphragm is located downstream from the upstream end 0.2 to 0.3 of the total length of said chamber.

12. The generator of claim 7 wherein the area of said perforation is less than the cross-sectional area of said passage.

13. The genertaor of claim 7 wherein said perforation comprises a plurality of openings.

14. The generator of claim 7 wherein said perforation comprises a plurality of openings, all of which are within said passage before fuel ignition.

15. The generator of claim 7 wherein said perforation comprises a plurality of openings, some of which are within said solid component before fuel ignition.

16. The generator of claim 7 wherein said perforation comprises a plurality of openings, some of which are partially within said solid component before fuel ignition.

17. The generator of claim 7 wherein said perforation comprises a centered opening and a plurality of radially spaced openings therefrom.

18. The generator of claim 6 wherein said solid component upstream portion includes a hypergolic constituent more volatile than the remainder of said portion.

19. The generator of claim 7 comprising additionally another injecting means downstream of said first mentioned injecting means.

20. The generator of claim 7 comprising additionally another injecting means downstream of said diaphragm.

21. The generator of claim 7 wherein said perforation is an annular opening.

22. The generator of claim 13 wherein at least one of said openings is circular.

References Cited by the Examiner

UNITED STATES PATENTS

| | | | |
|---|---|---|---|
| 3,068,641 | 12/1962 | Fox | 60—35.6 |
| 3,093,960 | 6/1963 | Tyson | 60—35.6 |
| 3,142,152 | 7/1964 | Sessums | 60—35.6 |
| 3,144,751 | 8/1964 | Blackman et al. | 60—35.6 |
| 3,159,104 | 12/1964 | Hodgson | 60—35.6 |
| 3,173,251 | 3/1965 | Allen et al. | 60—35.6 |

CARLTON R. CROYLE, *Primary Examiner.*